J. BUZBY.
CRANBERRY-SEPARATOR.

No. 173,583. Patented Feb. 15, 1876.

UNITED STATES PATENT OFFICE.

JOHN BUZBY, OF MOORESTOWN, NEW JERSEY.

IMPROVEMENT IN CRANBERRY-SEPARATORS.

Specification forming part of Letters Patent No. 173,583, dated February 15, 1876; application filed December 10, 1875.

*To all whom it may concern:*

Be it known that I, JOHN BUZBY, of Moorestown, in the county of Burlington and State of New Jersey, have invented a new and Improved Cranberry Cleaner and Separator; and I do hereby declare that the following is a full, clear, and exact description of the same, reference being had to the accompanying drawing, forming a part of this specification.

The object of my invention is to provide an improved machine for cleaning cranberries and separating the sound from the unsound or otherwise defective ones. This object is perfectly attained, both as to large and small berries, by the construction and arrangement of parts illustrated in the accompanying drawing, in which—

Figure 1:
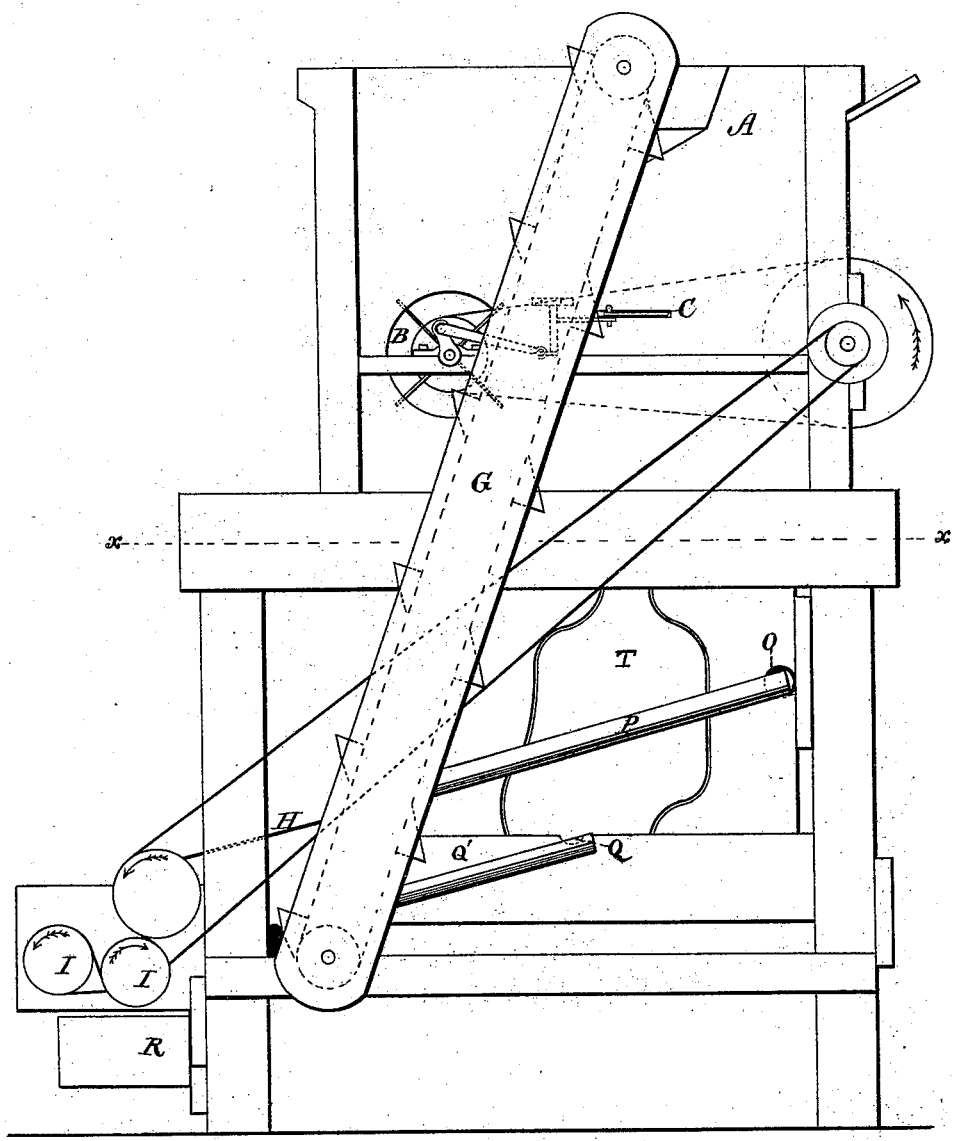
Figure 2:
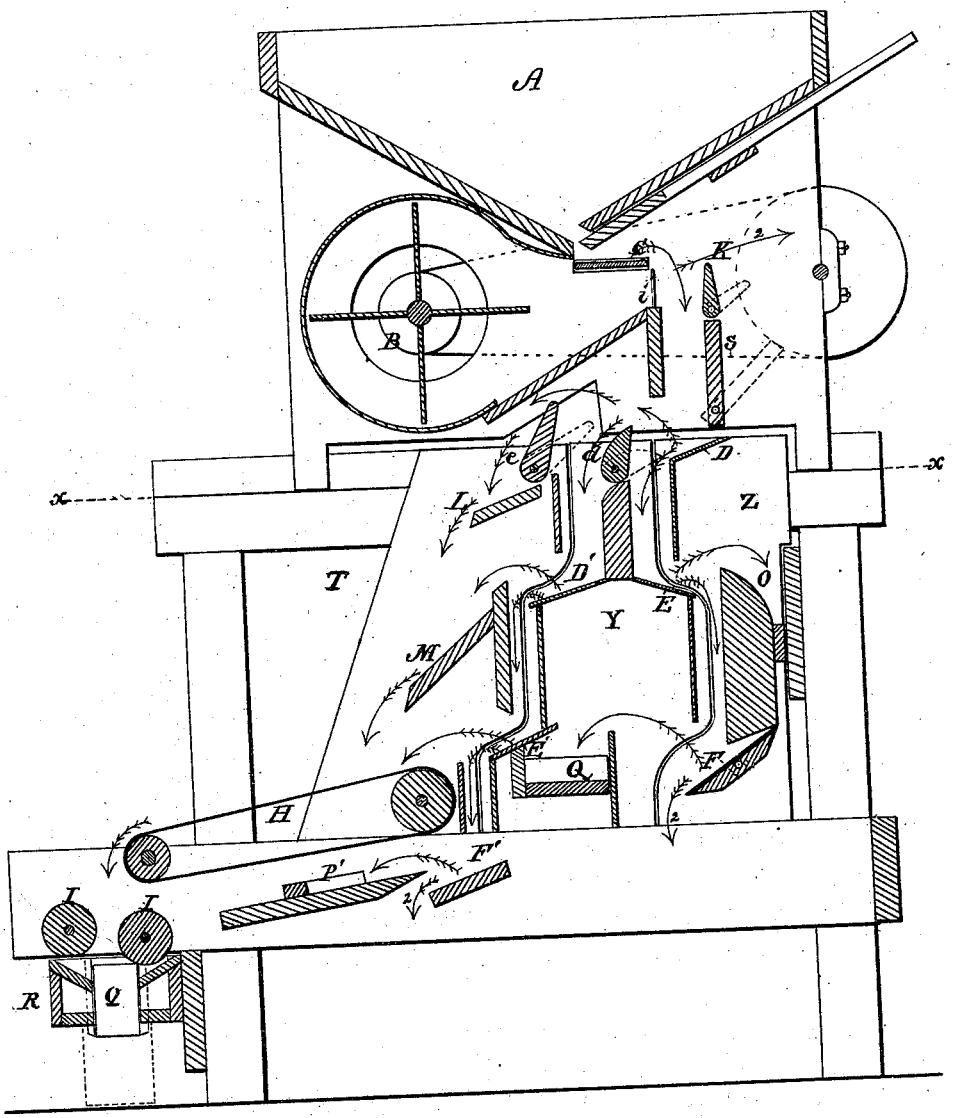
Figure 3:
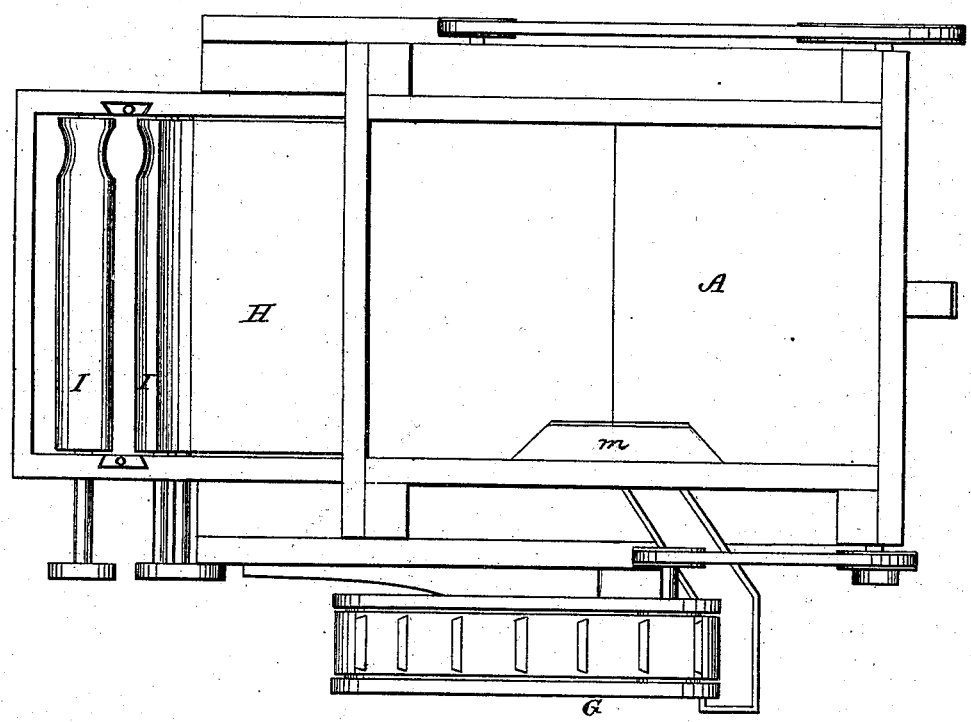
Figure 4:
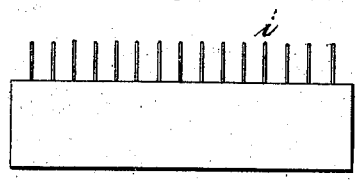

Figure 1 is a side elevation, Fig. 2 a sectional elevation, and Fig. 3 a plan view, of my improved machine. Fig. 4 is a detail view.

The chief parts or elements of my improved machine are a hopper, A, into which the berries are first placed; a fan, B, by which a blast of the requisite force is impelled through the berries as they pass from the hopper over the shaker C; a series of inclines or bounders, D E, upon which the berries successively fall, and from each of which the sound ones rebound, and thus become separated from the unsound; a corresponding series of regulators, $d\ e\ f$, for controlling such separation and the passage of the berries in different directions into different receptacles; an elevator, G, by which a certain portion of the mixed sound and unsound berries are reconveyed to the hopper to be again passed through the machine; a traveling delivery-apron, H, sorting rollers I I, and a hopper and feed-box attachment, K.

The aforesaid shaker C is reciprocated endwise by a suitable connection with the shaft of fan B.

A series of vertical rods, $i$, are arranged beneath the front edge of the shaker, to prevent any berries falling or rebounding into the fan-chamber, and a blast-regulator, consisting of a pivoted transverse plate, $k$, is arranged directly in front of and parallel to the rods $i$. By adjusting it more or less inclined from a horizontal, the escape of the lighter but sound berries, along with the foreign substances which the blast removes and carries away from the stream of falling berries, is prevented.

It will be perceived that the function of the fan is substantially the same as in the ordinary grain winnower or separator.

The berries fall first upon the incline D, and the best and soundest rebound therefrom, and thus pass over both the pivoted regulators $d\ e$, strike upon the inclined shelf L, next upon shelf M, and finally land upon the endless traveling apron H, by which they are delivered to the sorting-rollers I. A portion of mixed sound and unsound berries will pass over regulator $d$ only, and be disposed of as hereinafter described. The remaining portion of the berries, which did not rebound from incline D, falls directly upon the second incline E, whence most of the sound berries not separated out at the previous operation will rebound and pass to rearward into box or trough O, whence they escape, and are carried to and delivered upon the apron H by means of inclined troughs, P, attached to the outer side or frame of the machine. At the next rebound from the third incline F, mixed sound and unsound berries will pass forward into trough Q, and thence be delivered to the elevator, and thereby to the hopper A. The unsound berries will pass downward. Still another incline will, in practice, be employed to complete the separation. A set of inclines, D' E' F', are arranged in front of those above described, to sort the mixed sound and unsound berries, which, as above stated, pass over the first regulator, $d$, at the same time the best and soundest berries pass over the second or front regulator, $e$, upon apron H. The berries which thus pass over the regulator $d$ only fall upon incline D', whence the soundest of them rebound, fall upon shelf M, thence upon apron H. Those which fail to thus rebound from D' fall upon incline E', and some thereof rebound upon apron H. The remainder fall upon incline F', and all that are of any value among them rebound upon shelf P', and pass through a hole in the side of the machine, and are carried up to hopper A.

The courses of the berries are indicated by arrows. Arrows marked 2 indicate the direction taken by worthless or unsound berries.

All the mixed sound and unsound berries delivered to the endless belt elevator G are by it carried up and deposited in the hopper A, as will be readily understood from the drawing. I prefer, however, to deliver them through the side of the hopper, beneath a shelf or shield, m, so that they are readily removed by the shaker.

The apron H is stretched over parallel rotating shafts. The sorting-rollers I rotate in opposite directions, as indicated by arrows, so that the berries cannot be crushed. They are cut away at one end (Fig. 3) to form an opening of sufficient size to allow the largest berries to pass between them. The smaller berries pass down between the other portions of the rollers, so that I secure two-size grades of berries.

A hopper, R, is placed beneath the rollers I, and provided with a vertical slide, o, at one or both ends. Such slide may be adjusted higher or lower to govern the depth of the cranberries in the boxes placed beneath the hopper R to receive the berries. Thus: when a box is sufficiently full, another of like form and size is placed end to end with it, and the filled box thereby pushed out from under the hopper and its place occupied by the empty one A, the filled box is pushed along, the slide o removes or scrapes off the berries to a certain predetermined depth, so that the box is ready to have its cover applied without further labor.

The several regulators, which will in practice be provided for the several inclines of each series, are pivoted like the blast-regulator K, and each provided with an arm by which it may be adjusted or inclined more or less to prevent unsound berries passing over them.

The passage above the first incline D is liable to become choked by the adhesion and gradual accumulation of the gum and dirt adhering to the berries, and I hence pivot the side S of said passage to permit it, S, to be turned outward, and thus render the passage readily and conveniently accessible for removal of the mass from time to time as necessary.

For the same purpose I construct lower portion, T, of the body of the machine in which the sets of inclines are secured in sections X Y Z, the central section Y being fixed, and the others removable. The several inclines may be pivoted to enable their angle of inclination to be changed according as the cranberries to be separated are more or less decayed, the inclination from a horizontal being greatest when the berries are softest, so that they will not adhere to the inclines and thus obstruct the operation of the machine.

All that portion of the machine above the line x x, Figs. 1 and 2, is made detachable from the portion below such line, in order that the cleaner may be detached and removed for use separately, when desired, for cleaning cranberries which do not require separating, &c. The two portions are connected by bolts or screws to adapt them for such disconnection.

As shown, the several rotating parts of the machine, the fan, elevator, apron, and sorting-rollers, are connected by belts, so as to derive motion from one source.

It may be stated that one cause of the sound and unsound berries failing to separate at the first rebound is chiefly the striking of one upon another instead of upon the hard surface of the incline itself.

I propose to employ glass as the material of which the several inclines are composed, it being preferable to wood in that it is impervious to moisture and will not become rough in use.

The glass face of pivoted incline F is indicated by a thick dark line.

What I claim is—

1. In a cranberry-cleaner the combination of the hopper, the fan, the shaker, the vertical rods i protecting the mouth of the fan-chamber, the blast-regulator K, and the vertical passage into which the winnowed cranberries are delivered, all constructed and arranged substantially as shown and described.

2. The combination of the first incline D and the pivoted adjustable regulators d e, as and for the purpose specified.

3. In combination with the trough Q receiving the berries from the rear series of inclines, as specified, the side or lateral conduit $Q^1$, the elevator G, and hopper, as set forth.

4. The lower portion, T, of the casing of the machine carrying the separating shelves constructed in sections X Y Z, of which the outer sections X and Z are detachable, as and for the purpose specified.

5. The combination of the side passage P with the open-ended trough or receptacle O for the sound berries delivered from the second incline, and the traveling apron H, whereby said berries are conveyed to the sorting attachment, as hereinbefore set forth.

6. The sorting-rollers I rotating in opposite directions upward and outward from each other, and cut out at opposite points, as shown and described, to operate as specified.

7. The hopper attachment having a vertical slide o at one end, as shown and described, to operate as specified.

8. The inclines, made of glass as set forth.

The above specification of my invention signed by me this 23d day of November, 1875.

JOHN BUZBY.

Witnesses:
A. W. HART,
SOLON C. KEMON.